United States Patent [19]

Polderman

[11] 4,054,199
[45] Oct. 18, 1977

[54] DEVICE FOR TRANSFORMING A PLURALITY OF DISORDERLY ADVANCED CONTAINERS INTO A SINGLE ROW

[75] Inventor: Pieter Aart Polderman, Haarlem, Netherlands

[73] Assignee: Stork Amsterdam B.V., Amsterdam, Netherlands

[21] Appl. No.: 616,440

[22] Filed: Sept. 24, 1975

[30] Foreign Application Priority Data

Sept. 27, 1974 Netherlands .................. 7412855

[51] Int. Cl.² ............................................. B65G 47/26
[52] U.S. Cl. ....................................... 198/452; 198/580
[58] Field of Search .................. 198/32, 79, 80, 452, 198/454, 580, 601

[56] References Cited

U.S. PATENT DOCUMENTS

| 2,315,880 | 4/1943 | Stiles | 198/32 |
| 3,162,291 | 12/1964 | Bell | 198/32 X |
| 3,310,151 | 3/1967 | Carter | 198/32 |

FOREIGN PATENT DOCUMENTS 718,216  11/1954  United Kingdom .................. 198/32

Primary Examiner—Evon C. Blunk
Assistant Examiner—Douglas D. Watts
Attorney, Agent, or Firm—Barry G. Magidoff

[57] ABSTRACT

Device for single-lining a plurality of disorderly advanced containers, comprising a number of parallel adjacent conveyors of which a first set serve to advance the containers against an inclined ramp so as to push the containers upon a second set of conveyors moving at an increased speed rate.

2 Claims, 2 Drawing Figures

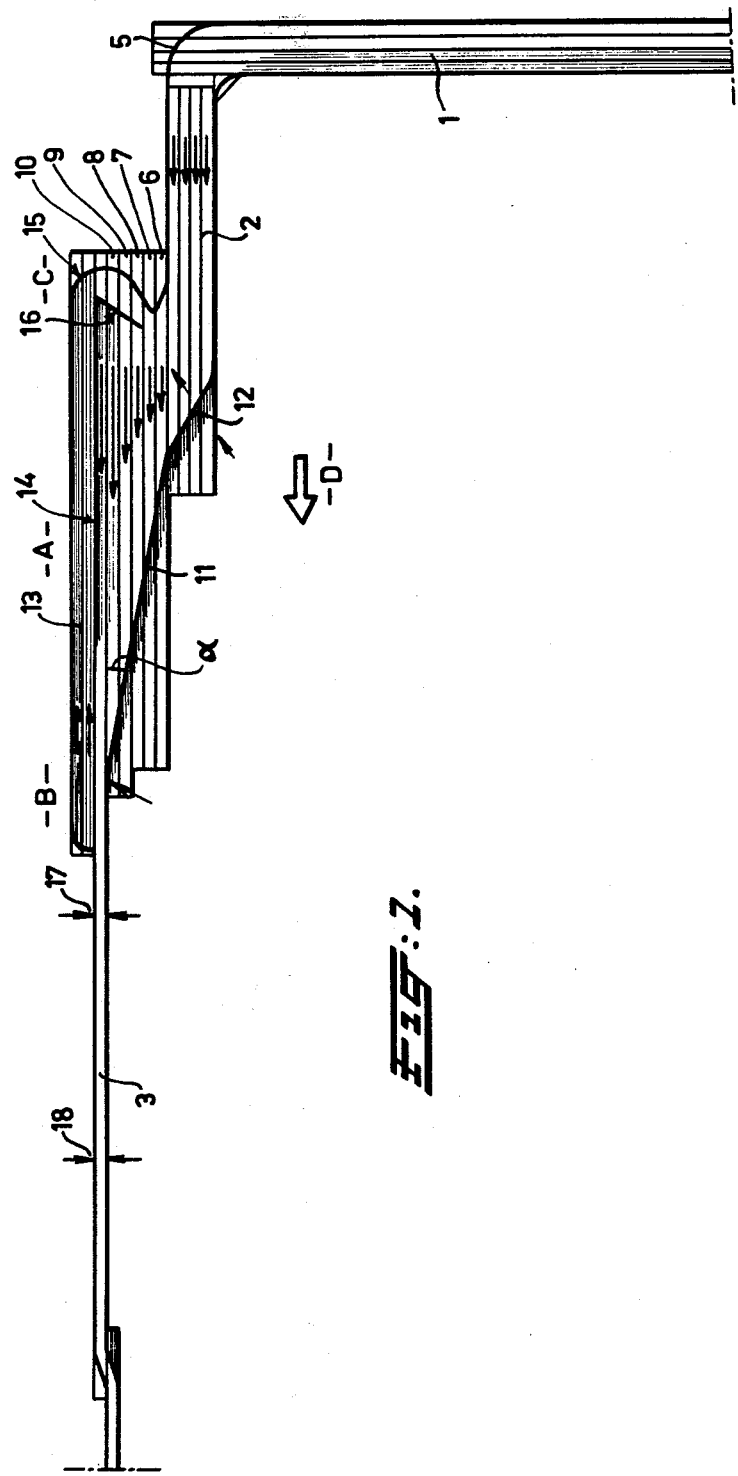

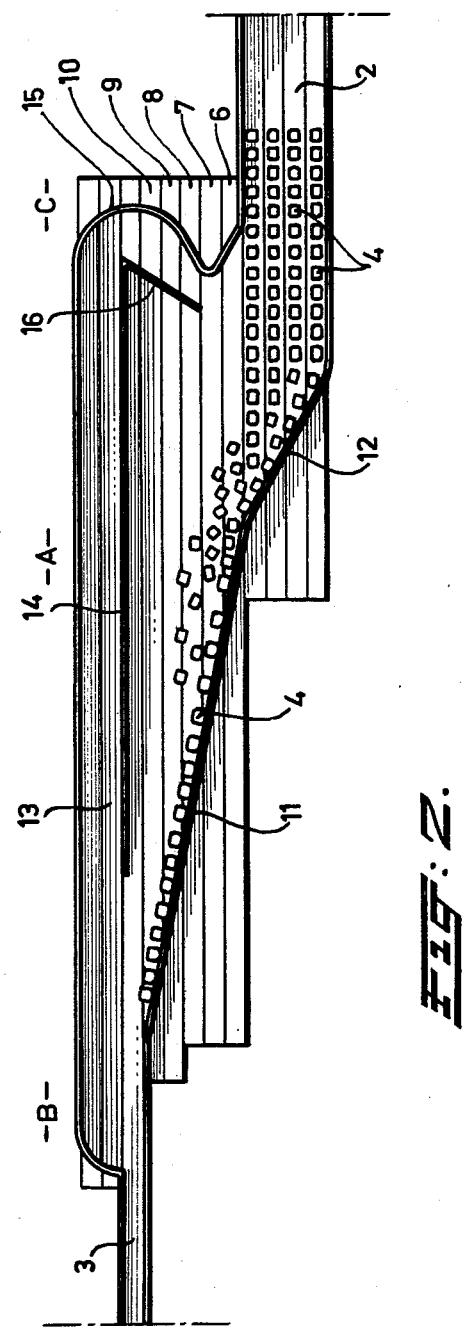

DEVICE FOR TRANSFORMING A PLURALITY OF DISORDERLY ADVANCED CONTAINERS INTO A SINGLE ROW

BACKGROUND OF THE INVENTION

My invention relates to a device for transforming a plurality of disorderly advanced, upright containers into a single row, which containers have an arbitrary circumference and are advanced on a buffer path, said device comprising a plurality of conveyors driven in a common direction. This transformation into alignment is necessary for performing particular operations with the containers, like a filling operation.

The conventional transformation devices operate according to the storage principle; the containers being advanced to a wedge-shaped space with the view of discharging the containers one by one and obtaining in this manner the single row aimed at. In this wedge-shaped space a retention of the containers is produced, while the conveyors continue to move under the almost stationary containers.

Such a transformation system is known in various versions and it functions satisfactorily when the containers have a smooth cylindrical outer circumference as is mostly the case with bottles and tins. Quite another situation arises as soon as the containers have an arbitrarily shaped circumference or when they are cylindrical but have a very rough outer surface. Under these circumstances the containers will be compressed into an immobile mass; the conveyors keep moving under the containers, but are incapable to transport any container.

SUMMARY OF THE INVENTION

The device according to my invention allows to perform the alignment irrespective of shape or properties of the container's outside. For that purpose the device shows:

- a metering path on which a number of $n$ adjacent containers driven at a speed $V_1$ can be advanced towards an oblique rail which serves to guide the containers in a lateral direction, said metering path adjoining the buffer path;
- a transformation area situated beside the metering path and adjoining the part upstream of the rail, the transformation area consisting of five adjacent conveyors the first conveyor adjoining the metering path having a velocity being a multiple of the metering velocity $V_1$, while the velocity of the other conveyors increases for each successive conveyor with at least 10%;
- a discharge path located beside the transformation area by which the containers are discharged in a single row at a speed $V_3$ which is at least equal to $n \times V_1$;
- a lateral guide arranged over the transformation area and enclosing an angle ($\alpha$) smaller than 30° with the direction of movement for receiving and guiding the containers advancing at an increased speed towards the discharge path.

Due to these features there is already a sufficient space between the containers at the beginning of the transformation area owing to which the containers can get after each other in contact with the lateral guide and be subsequently moved towards the discharge path, where they are discharged in a single row. An essential difference between the present device and the prior art consists in that no retention will occur and that the containers will always move at a speed corresponding to the speed of the underlying conveyor. This circumstance is due to the aforementioned ratio between the velocity $V_3$ of the discharge path and the product of the velocity $V_1$ of the metering path multiplied by the number of $n$ containers capable of standing on the width of this track.

SURVEY OF THE DRAWINGS

FIG. 1 shows the complete device;
FIG. 2 shows on a larger scale the transformation area of the device according to FIG. 1 in a snap-shot fashion.

DESCRIPTION OF A PREFERRED EMBODIMENT

The device is composed from four essential parts, viz. a buffer path 1, a metering path 2, an discharge path 3 and thereinbetween a transformation area A. The buffer path 1 leads to the metering path 2, which consists of four adjacent conveyors, moving at the same speed $V_1$. The containers 4 to be transformed are supplied from the buffer path 1 which lies perpendicular to the metering path 2 and merges via a bend 5 into the latter. This bend serves to absorb the stowage pressure from the buffer path. The transformation area A consists of a plurality, in this case five, of juxtaposed conveyors 6 - 10 which are driven at an increasing speed. A lateral guide 11 is further arranged obliquely with respect to the common advance direction V of all conveyors. The lateral guide 11 has an elongation or rail 12 above the metering path 2 which consists of four identical parts as described above.

The device according to my invention is particular as no stowage pressure is produced and that the containers which are supplied gradually via the metering path 2 are rapidly carried away by the conveyors 6 - 10, as is shown in FIG. 2. The conveyor 6 adjacent to the metering path 2 has a speed which is a multiple of that of the metering path. The speed of the consecutive conveyors 7 - 10 increases for each of them. According to an example the speed of the metering path 2 is 6 m/min. The speed of the first conveyor 6 is 24 m/min. For the other intermediate conveyors 7 - 10 the speed increases stepwise to 27, 31, 34 and 40 m/min.

Adjacent to the discharge path 3 one or more return paths 13 are positioned moving with a speed opposite to the common direction of movement D. The return path 13 is separated from the discharge path 3 by an intermediate wall 14 extending in the direction of movement except for both an area B in the proximity of the end of the lateral guide 11 and an area C at the beginning of the conveyors 6 - 10. In this latter area a heightened guide bend 15 is disposed. Fallen over containers, if any, will be returned by track 13 and will move underneath bend 15 so as to land in a receptacle. The upright containers 4 are returned by bend 15 to the conveyors 6 - 10 and will land via a plate 16 on the first conveyors 6, 7.

The embodiment described hereinbefore has a capacity of about 350 containers per minute. When a container passes from metering path 2 to first conveyor 6, a considerable acceleration is produced, so that the containers move apart and consequently do not get into a jammed position. The passage of the containers from metering path 2 to the first conveyor 6 is effected by means of the rail 12. Further transport of the containers to the conveyors 7 - 10 is effected by means of the lateral guide 11 enclosing an angle α, ranging from 15° to 20°, with the direction of movement D.

The number of conveyors in the transformation area required in the device according to the invention is determined by the capacity at which the containers are supplied and by the stability and dimensions of each container. The last conveyor 10 has a speed which is about equal to that of the discharge path 3, a certain spacing being available between the consecutive containers 4. The first conveyor 6 has a speed which is a multiple of the speed of the metering path 2, which difference depends, however, on the stability of the container. When high speeds are applied in the discharge path 3 and an abrupt stop occurs, the containers will collide and may break, when made of glass. With glass bottles high speeds can be applied, nevertheless when a control system is available whereby a uniform braking at an abrupt stop can be obtained. In the area B not only the bottles which are temporarily unwanted can be discharged, but any fallen container can be returned to area C at the beginning of the intermediate conveyors through return track 13. Owing to this embodiment a fallen or oblique container cannot give rise to obstructions in a blind angle and the relating container is returned.

The discharge capacity of the transformation device can be adapted to the conditions of that part of the installation lying beyond this device (that is to say the filling-, sealing-, and packing machine, if any). For the purpose two container sensing means 17 and 18 are arranged at some distance from each other in the discharge path 3. These container sensing means are responsive to the presence of a closed row of containers and are capable of sending a signal to the drive for the metering path and the transformation path. In this way the supply of containers to the discharge path can be timely tuned to the prevailing circumstances.

As soon as the container sensing means 18 records that its area is filled with containers, a signal is set to the driving means for both the metering path 2 and the conveyors 6 - 10 in order to drive these conveyors at a lower, for example half the speed. The container sensing means will mostly be a photoelectric cell which reacts with some delay to an interruption of a certain time lapse.

When container sensing means 17, too, records that path is filled, the metering path 2 and the conveyors 6 - 10 are completely put out of action. The discharge path 3 and the return track 13 keep moving. As soon as the part of the discharge path 3 in front of feeler 17 is empty, the metering path 2 and the conveyors 6 - 10 are again put into operation, for instance at half the speed. When feeler 18, too, records that there are no longer any stationary containers in the area, then a signal is sent to metering path 2 and to conveyors 6 - 10, so that these conveyors are driven again at full speed.

The device according to my invention is particularly designed for containers with a square or non-circular cross section or for cylindrical containers with a rough outer surface.

What I claim is:

1. A device for transforming a plurality of disordered advancing upright containers into a single row, which containers have an arbitrary circumference and are advanced on a buffer path, said device having a plurality of conveyors driven in a common direction and comprising:

a metering path being sufficiently wide to advance $n$ containers and capable of being driven at a speed $V_1$;

a first lateral guide situated above and extending obliquely across the metering path;

a transformation area comprising a plurality of adjacent transformation conveyors, the transformation conveyors being mutually parallel and parallel to the metering path conveyor, a first transformation conveyor being immediately adjacent the metering path conveyor at the portion of the metering path conveyor immediately upstream of the first lateral guide and being capable of being driven at a speed which is a multiple of the metering path speed $V_1$, and each additional transformation conveyor more distant from the metering path, having a velocity at least 10% greater than the immediately preceding transformation conveyor;

a discharge path conveyor being sufficiently wide to discharge a single row of containers, the discharge path conveyor being parallel and immediately adjacent to the transformation conveyor most distant from the metering path conveyor and being capable of being driven at a speed $V_3$, at least equal to $n \times V_1$;

a second lateral guide situated above and extending obliquely across the transformation conveyors at an angle of less than 30° with the direction of movement of the transformation conveyors;

whereby containers moving along the metering path conveyors are directed by the first lateral guide onto the first transformation conveyor and then directed by the second lateral guide successively across the transformation conveyors towards and onto the discharge conveyor;

a return conveyor being situated adjacent to and extending substantially parallel to the discharge conveyor and being designed and adapted to move in a direction relatively upstream of the discharge conveyor, an intermediate wall situated so as to separate the return conveyor and the discharge conveyor between two points intermediate the end of the second lateral guide and the ends of the return conveyor and the discharge conveyor, and a guide bend disposed across the return conveyor and the discharge conveyor and situated intermediate the end of the intermediate wall and the ends of the return and discharge conveyors, whereby upright containers returning on the return conveyors are directed to the transformation area.

2. Device according to claim 1, wherein the guide bend is arranged at a high level so that fallen containers can pass underneath the same.

* * * * *